United States Patent
Imura et al.

(10) Patent No.: US 7,853,366 B2
(45) Date of Patent: Dec. 14, 2010

(54) VEHICLE CONTROL APPARATUS

(75) Inventors: Shinya Imura, Toride (JP); Atsushi Yokoyama, Tokyo (JP); Junya Takahashi, Hitachinaka (JP); Tatsuya Yoshida, Naka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/259,948

(22) Filed: Oct. 28, 2008

(65) Prior Publication Data

US 2009/0112404 A1 Apr. 30, 2009

(30) Foreign Application Priority Data

Oct. 29, 2007 (JP) ............... 2007-280808

(51) Int. Cl.
- G05D 1/00 (2006.01)
- G05D 3/00 (2006.01)
- G06F 7/00 (2006.01)
- G06F 17/00 (2006.01)

(52) U.S. Cl. ............... 701/1; 701/36; 701/37; 701/38; 701/41; 701/70; 340/440

(58) Field of Classification Search ............... 701/1, 701/41, 36, 37, 38, 45, 70; 340/436, 440; 702/142; 280/735
See application file for complete search history.

(56) References Cited

U.S. PATENT DOCUMENTS

| | | | |
|---|---|---|---|
| 5,088,762 A * | 2/1992 | Fukuyama et al. ....... | 280/5.508 |
| 5,519,611 A | 5/1996 | Tagawa et al. | |
| 5,895,433 A * | 4/1999 | Chen et al. ............... | 701/41 |
| 5,925,084 A * | 7/1999 | Gotoh et al. ............... | 701/45 |
| 6,038,495 A * | 3/2000 | Schiffmann ............... | 701/1 |
| 6,175,792 B1 * | 1/2001 | Jones et al. ............... | 701/37 |
| 6,282,474 B1 * | 8/2001 | Chou et al. ............... | 701/45 |
| 6,292,759 B1 * | 9/2001 | Schiffmann ............... | 702/151 |
| 6,295,493 B1 * | 9/2001 | Kawazoe ............... | 701/38 |
| 6,415,215 B1 * | 7/2002 | Nishizaki et al. ............... | 701/70 |
| 6,477,480 B1 * | 11/2002 | Tseng et al. ............... | 702/142 |
| 6,529,803 B2 * | 3/2003 | Meyers et al. ............... | 701/1 |
| 6,584,388 B2 * | 6/2003 | Schubert et al. ............... | 701/46 |
| 7,079,928 B2 * | 7/2006 | Lu et al. ............... | 701/38 |
| 2002/0040268 A1 * | 4/2002 | Yamada et al. ............... | 701/74 |
| 2002/0056582 A1 * | 5/2002 | Chubb et al. ............... | 180/197 |
| 2002/0075139 A1 * | 6/2002 | Yamamoto et al. ............... | 340/436 |

(Continued)

FOREIGN PATENT DOCUMENTS

DE 42 21 059 A1 1/1993

(Continued)

OTHER PUBLICATIONS

European Search Report dated May 25, 2009 (Nine (9) pages).

(Continued)

*Primary Examiner*—Khoi Tran
*Assistant Examiner*—Jaime Figueroa
(74) *Attorney, Agent, or Firm*—Crowell & Moring LLP (57) ABSTRACT

A vehicle control apparatus having a vehicle state quantity detection unit for detecting vehicle state quantity such as a roller angular velocity, a lateral jerk calculation unit for calculating lateral jerk of a vehicle based on the vehicle state quantity, and a control unit for carrying out the vehicle control based on the lateral jerk.

4 Claims, 11 Drawing Sheets

U.S. PATENT DOCUMENTS

| | | | |
|---|---|---|---|
| 2002/0087235 A1* | 7/2002 | Aga et al. | 701/1 |
| 2002/0096003 A1* | 7/2002 | Yamada et al. | 74/20 |
| 2002/0099486 A1* | 7/2002 | Nagao et al. | 701/45 |
| 2002/0139599 A1* | 10/2002 | Lu et al. | 180/282 |
| 2002/0173882 A1* | 11/2002 | Tobaru et al. | 701/1 |
| 2004/0024505 A1* | 2/2004 | Salib et al. | 701/38 |
| 2004/0024509 A1* | 2/2004 | Salib et al. | 701/45 |
| 2004/0162654 A1 | 8/2004 | Lu et al. | |
| 2004/0176893 A1* | 9/2004 | Ogata et al. | 701/45 |
| 2004/0193352 A1* | 9/2004 | Ito et al. | 701/70 |
| 2004/0199317 A1* | 10/2004 | Ogata et al. | 701/45 |
| 2004/0254710 A1* | 12/2004 | Yano | 701/70 |
| 2005/0004730 A1* | 1/2005 | Suzuki et al. | 701/38 |
| 2005/0027426 A1 | 2/2005 | Kato et al. | |
| 2005/0080544 A1* | 4/2005 | Suzuki et al. | 701/70 |
| 2005/0149240 A1* | 7/2005 | Tseng et al. | 701/38 |
| 2005/0159864 A1 | 7/2005 | Ogata et al. | |
| 2005/0177296 A1 | 8/2005 | Brown et al. | |
| 2005/0192728 A1* | 9/2005 | Yasui et al. | 701/38 |
| 2005/0222728 A1* | 10/2005 | Hac et al. | 701/38 |
| 2005/0246085 A1* | 11/2005 | Salib et al. | 701/70 |
| 2005/0256628 A1* | 11/2005 | Salib et al. | 701/70 |
| 2005/0257981 A1* | 11/2005 | Iyoda et al. | 180/282 |
| 2005/0273240 A1* | 12/2005 | Brown et al. | 701/70 |
| 2006/0069489 A1* | 3/2006 | Chen et al. | 701/70 |
| 2006/0293826 A1* | 12/2006 | Hong et al. | 701/96 |
| 2007/0162202 A1 | 7/2007 | Moshchuk et al. | |

FOREIGN PATENT DOCUMENTS

| | | |
|---|---|---|
| EP | 0 453 771 A2 | 10/1991 |
| EP | 1 386 803 A1 | 2/2004 |
| EP | 1 514 754 A2 | 3/2005 |
| EP | 1 568 521 A2 | 8/2005 |
| JP | 1-160719 A | 6/1989 |
| JP | 2621390 B2 | 4/1997 |
| JP | 2004-243813 A | 9/2004 |
| JP | 2007-112367 A | 5/2007 |
| JP | 2007-139011 A | 6/2007 |
| JP | 2007-290650 A | 11/2007 |

OTHER PUBLICATIONS

Abe Masato, "Motion and Control of an Automobile", $2^{ND}$ Edition, ages 52, 93 and 171 from Sanaido, (Four (4) pages).

Office Action dated May 19, 2010 (Five (5) pages).

\* cited by examiner

FIG. 6A
ROLL ANGULAR VELOCITY SENSOR VALUE

FIG. 6B
CALCULATED VALUE ACCORDING TO THE PRESENT INVENTION [VALUE OBTAINED BY PASSING A SIGNAL OF FIG. 6A THROUGH A TRANSFER FUNCTION], AND TRUE VALUE

STEERING ANGLE SENSOR VALUE

FIG. 14B

ESTIMATED LATERAL ACCELERATION $A_Y'$ [VALUE OBTAINED BY PASSING A SIGNAL OF FIG. 14A (FIG. 15A) THROUGH A TRANSFER FUNCTION], AND LATERAL ACCELERATION SENSOR VALUE $A_Y$

FIG. 14C

CALCULATED VALUE BY THE PRESENT INVENTION AND TRUE VALUE

VEHICLE CONTROL APPARATUS

BACKGROUND OF THE INVENTION

The present invention relates to a vehicle control apparatus for carrying out the vehicle control based on a lateral jerk of a vehicle, in particular, the present invention relates to the vehicle control apparatus which can carry out the vehicle control by calculating (estimating) the lateral jerk with high accuracy.

Conventionally, it has been known the vehicle control apparatus, wherein, by determining the lateral jerk of a vehicle, it is designed to carry out the vehicle control based on this lateral jerk, in particular, the vehicle control where lane change or turning-around etc. was carried out.

For example, in JP-A-2007-112367, a method for detecting a vehicle state such as instantaneous cornering power of a vehicle based on the lateral jerk of a vehicle has been disclosed, here, it is designed to determine the (value of) lateral jerk, by differentiating the (value of) lateral acceleration detected by a lateral acceleration sensor.

In addition, in Japanese Patent No. 2621390, a method for enhancing response property of position control, by estimating near future lateral acceleration from the present lateral acceleration and lateral jerk, and by controlling a suspension based on this estimated value, has been disclosed, here, the (value of) lateral jerk to be used for control calculation is designed to be determined by a map prepared unambiguously as a function of vehicle speed and steering angular speed.

SUMMARY OF THE INVENTION

However, in determination of the lateral jerk by differentiating the lateral acceleration detected by the lateral acceleration sensor, as described in JP-A-2007-112367, there is the following problem. That is, because a noise is generally commingled in a sensor signal, the differentiation thereof results in increase in noise, and deteriorates the accuracy of the resulting lateral jerk (accuracy relative to practical lateral jerk). In addition, the noise can be removed by passing differentiated lateral jerk through a low-pass filter, however, it results in delay of a signal phase, and also in this case, accuracy of the resulting lateral jerk is deteriorated.

In addition, in determination of lateral jerk by a map specified unambiguously as a function of vehicle speed and steering angular speed, as described in Japanese Patent No. 2621390, there is the following problem. That is, when a vehicle is skidding, because the lateral jerk cannot be determined unambiguously from vehicle speed and steering angular speed, also in this case, accuracy of the resulting lateral jerk is deteriorated.

As described above, when accuracy of lateral jerk determined is poor, vehicle control, where this lateral jerk is used in control calculation, becomes an inadequate one.

In view of the above circumstance, it is an object of the present invention to provide a vehicle control apparatus which is capable of calculating the lateral jerk to be used in control calculation with high accuracy, without incurring increase in noise, and also without generating so much phase delay, as well as calculating it with high accuracy even when a vehicle is skidding, and carrying out the vehicle control adequately based on this calculated lateral jerk.

In order to attain the above object, a vehicle control apparatus relevant to the present invention is characterized in being equipped with a vehicle state quantity detection unit for detecting a vehicle state quantity, a lateral jerk calculation unit for calculating the lateral jerk of a vehicle based on the vehicle state quantity, and a control unit for carrying out the vehicle control based on the lateral jerk.

In a preferable embodiment, it is designed that the vehicle state quantity detection unit detects a roll angular velocity as the vehicle state quantity, and the lateral jerk calculation unit estimates the lateral jerk, based on the roll angular velocity.

Preferably, it is designed that the lateral jerk calculation unit estimates the lateral jerk by using a transfer function having the roll angular velocity as input, and the lateral jerk as output.

In other preferable embodiment, it is designed that the vehicle state quantity detection unit detects steering angle as the vehicle state quantity, and the lateral jerk calculation unit estimates the lateral jerk based on the steering angle.

In this case, it is preferably designed that the lateral jerk calculation unit estimates the lateral jerk by using a transfer function having the steering angle as input, and lateral acceleration of a vehicle as output.

In other preferable embodiment, it is designed that the control unit carries out the control to start acceleration or deceleration, or end acceleration or deceleration, or make acceleration constant, during a period where the lateral jerk value is near zero.

In still other preferable embodiment, it is designed that the control unit carries out the control to make close a value obtained by dividing the lateral jerk with vehicle speed, and a value of yaw angular acceleration.

Another vehicle control apparatus relevant to the present invention is characterized by being equipped with a roll angular velocity detection unit for detecting a roll angular velocity of a vehicle, and a control unit carrying out the control to start acceleration or deceleration, or end acceleration or deceleration, or make acceleration constant, during a period when value of the roll angular velocity is near zero.

In this case, in a preferable embodiment, it is designed to be equipped with a lateral jerk calculation unit for estimating the lateral jerk based on the roll angular velocity, wherein the control unit carries out the control based on the lateral jerk.

In addition, a vehicle relevant to the present invention is characterized by being equipped with a vehicle control apparatus of the above configuration.

In a vehicle control apparatus of the present invention, because it is designed to calculate (estimate) the lateral jerk by using (a transfer function having, as input,) roll angular velocity or steering angle as vehicle state quantity, it is capable of calculating the lateral jerk to be used in control calculation with high accuracy, without incurring increase in noise, and also without generating so much phase delay, as well as calculating it with high accuracy even when a vehicle is skidding. Therefore, the vehicle control based on this calculated lateral jerk, for example, the breaking and driving force control of acceleration or deceleration can be carried out accurately in accordance with intention of a driver. In addition, also the yaw moment control etc., which is capable of significantly enhancing the response property and convergence of vehicle movement, can be carried out adequately.

Other objects, features and advantages of the invention will become apparent from the following description of the embodiments of the invention taken in conjunction with the accompanying drawings.

DESCRIPTION OF THE EMBODIMENTS

Explanation will be given below on embodiments with reference to drawings.

Figure 1:
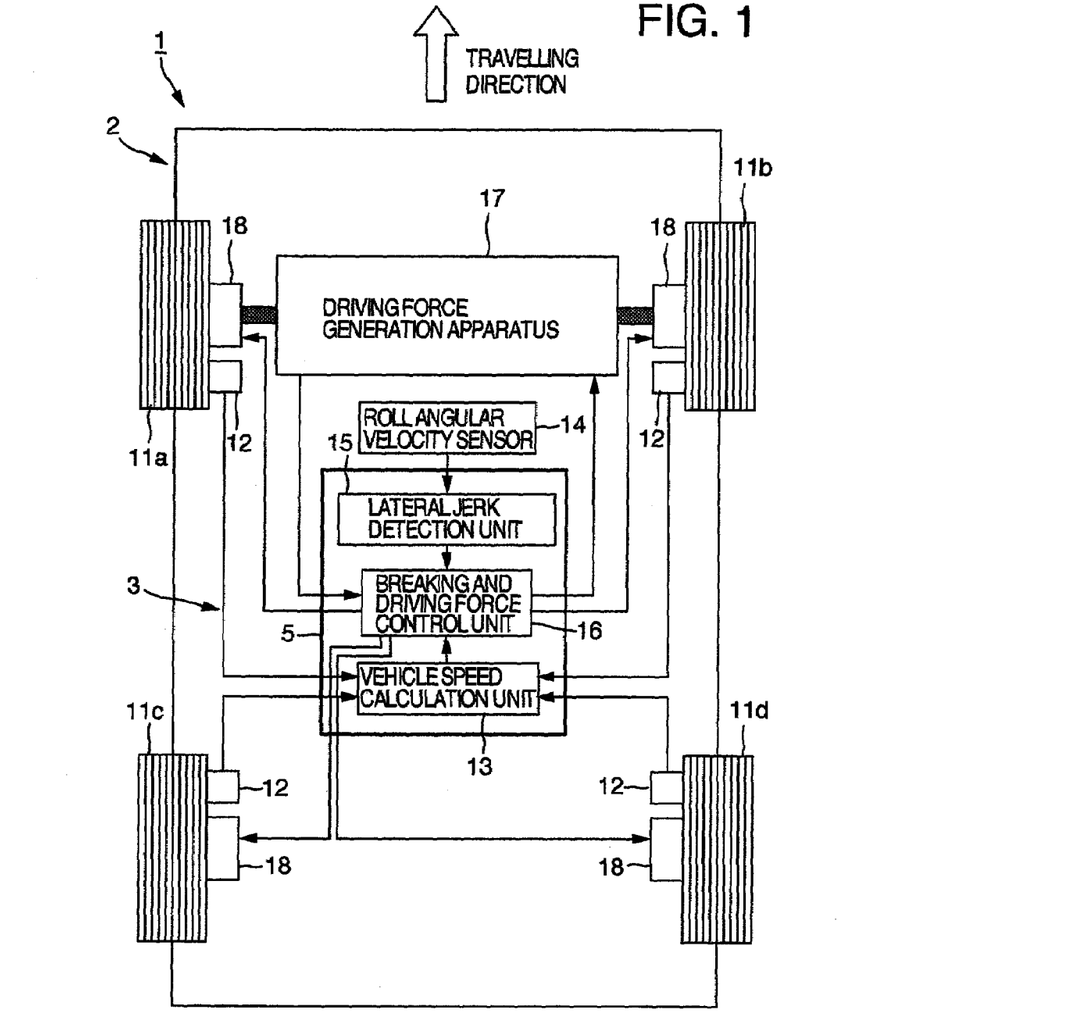
FIG. 1 is a schematic block diagram showing a vehicle mounted with a vehicle control apparatus.

FIG. 1 is a schematic block diagram showing a vehicle 1 mounted with a vehicle control apparatus.

A vehicle 1 shown in FIG. 1 is a front-wheel-drive car, and is equipped with wheels 11a, 11b, 11c and 11d at front, rear, left and right of a vehicle, and the rotation driving force from a driving force generation apparatus 17, which is configured by, for example, a gasoline engine (electrically-driven motor etc. may be acceptable) or transmission etc. is designed to be transmitted to the front wheels 11a and 11b. At each of the wheels 11a, 11b, 11c and 11d, a wheel speed sensor 12 for detecting rotation speed of the wheel (rotation number), and a break 18 are attached.

In addition, at a predetermined position of a vehicle body 2, a control unit 5 having a built-in microcomputer and built-in electronic circuit parts for carrying out the vehicle control is equipped as a main configuration element of a vehicle control apparatus 3 of the present embodiment, as well as a roll angular velocity sensor 14 is allocated. The built-in microcomputer in the control unit 5 is well known themselves, and equipped with CPU, ROM, RAM, IO and the like. In addition, the roll angular velocity sensor 14 is one for detecting the roll angular velocity p of the vehicle 1, and is configured, for example, by a gyro sensor.

The control unit 5 is equipped with a vehicle speed calculation unit 13, where a wheal speed signal from a wheel speed sensor 12 attached at each of the wheels 11a, 11b, 11c and 11d is input, a lateral jerk calculation unit 15, where a roll angular velocity signal from the roll angular velocity sensor 14 is input, and a breaking and driving force control unit 16 for carrying out vehicle control (here, breaking control and driving force control) based on lateral jerk calculated from this lateral jerk calculation unit 15, as shown in a functional block diagram in FIG. 1.

The vehicle speed calculation unit 13 calculates a vehicle speed V, which is a speed in a travelling direction of the vehicle 1, based on rotation number of each of the wheels 11a, 11b, 11c and 11d detected by the wheel speed sensor 12. In calculation of the vehicle speed V, first, Va, Vb, Vc and Vd, which are the speeds of each of the wheels 11a, 11b, 11c and 11d in a travelling direction, are calculated by multiplying the radius to angular velocity of each of the wheels 11a, 11b, 11c and 11d. The vehicle speed V may be an average value of Va, Vb, Vc and Vd, or may be the lowest value of Va, Vb, Vc and Vd, in consideration of spinning possibility of some of the wheels of 11a, 11b, 11c and 11d, or may be the second lowest value thereof, or average value of the lowest value and the second lowest value, or the like.

The lateral jerk calculation unit 15 calculates (estimates) the lateral jerk Jy, based on the roll angular velocity p detected by the roll angular velocity sensor 14. The detail on this lateral jerk calculation unit 15 will be described later.

The breaking and driving force control unit 16 calculates control command value for controlling a driving force generation unit 17 or the break 18, based on vehicle speed or lateral jerk Jy or the like. The detail on this breaking and driving force control unit 16 will be described later.

Figure 2:
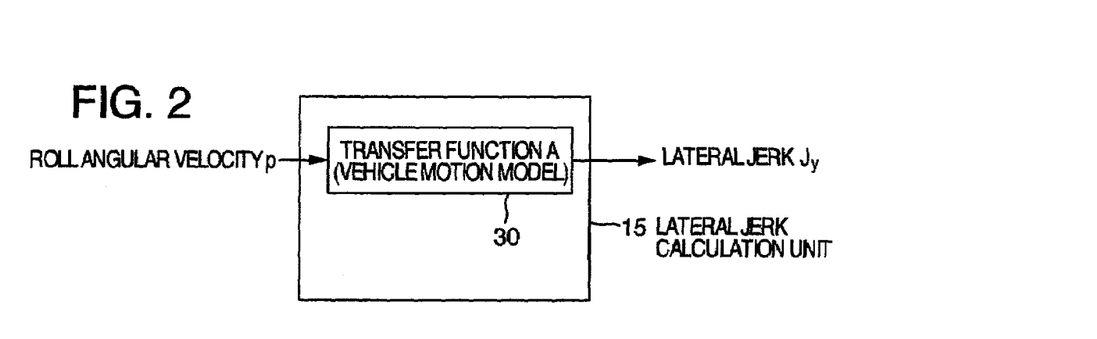
FIG. 2 is a block diagram showing a configuration example of a lateral jerk calculation unit in the vehicle control apparatus shown in FIG. 1.

The lateral jerk calculation unit 15 calculates, as shown in FIG. 2, the lateral jerk Jy by using (a vehicle motion model 30 represented by) a transfer function A having the roll angular velocity p as input and the lateral jerk Jy as output.

In detail, by expressing those obtained by Laplace transformation of the roll angular velocity p and the lateral jerk Jy, as p(s) and Jy(s), respectively, there is given the transfer function A=Jy(s)/p(s), and lateral jerk Jy is calculated from the following Expression 1 (Reference Literature: "Motion and control of an automobile" by Abe Masato, second edition, pages 171 and 52, published from Sankaido). Here, in the following Expression 1, g represents gravity acceleration, s represents Laplace operator, and further, ms: weight on a spring h: height from a roll center to center of gravity Ix: roll inertia moment Cx: roll viscosity Kx: roll rigidity $$\frac{J_y(s)}{p(s)} = \frac{I_x s^2 + C_x s + K_x - m_s g h}{m_s h} \quad (1)$$

In the Expression 1, because an order of numerator is larger than order of denominator, which makes calculation difficult as it is, the lateral jerk Jy may be calculated from the following Expression 2, by using relatively high frequency f (for example, 100 Hz).

$$\frac{J_y(s)}{p(s)} = \frac{I_x s^2 + C_x s + K_x - \dot{m}_s gh}{(1/2\pi f)^2 s^2 + (1/2\pi f)s + 1} \cdot \frac{1}{m_s h} \quad (2)$$

Figure 3A:
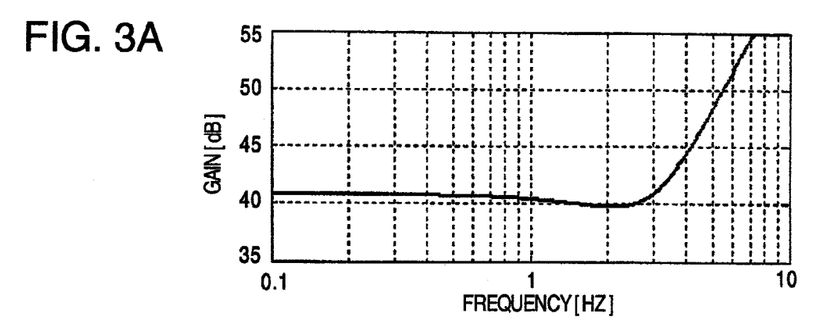
FIGS. 3A and 3B are graphs provided to explain frequency response characteristics of the transfer function A [Expression 2] shown in FIG. 2.
Figure 3B:
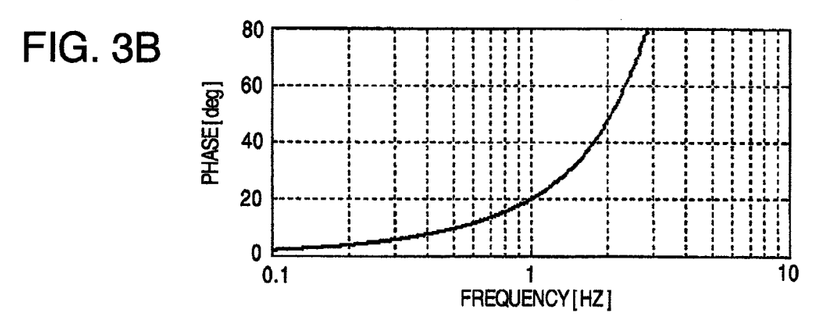

FIGS. 3A and 3B are graphs showing examples of frequency response characteristics of the transfer function A represented by the Expression 2, taking the frequency as abscissa axis, and the gain and the phase as ordinate axis, respectively. As shown in the drawing, the transfer function A has the phase lead characteristics, and has the feature in calculating the lateral jerk Jy by a little advancing the phase of roll angular velocity p.

In addition, in calculation of lateral jerk Jy, the following Expression 3 may be used, which is a simplified form of the Expression 2.

$$\frac{J_y(s)}{p(s)} = \frac{T_1 s + 1}{T_2 s + 1} \cdot \frac{K_x - m_s gh}{m_s h} \quad (3)$$

T1 and T2 in the Expression 3 are set in advance so that the frequency response characteristics up to about 1 Hz becomes close to characteristics shown in FIGS. 3A and 3B.

Figure 4A:
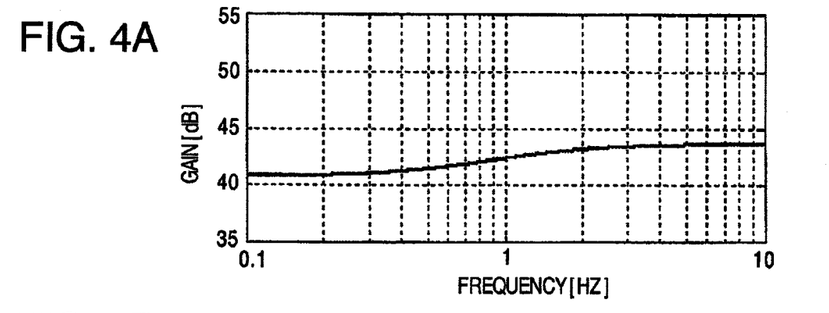
FIGS. 4A and 4B are graphs provided to explain frequency response characteristics of the transfer function A [Expression 3] shown in FIG. 2.
Figure 4B:
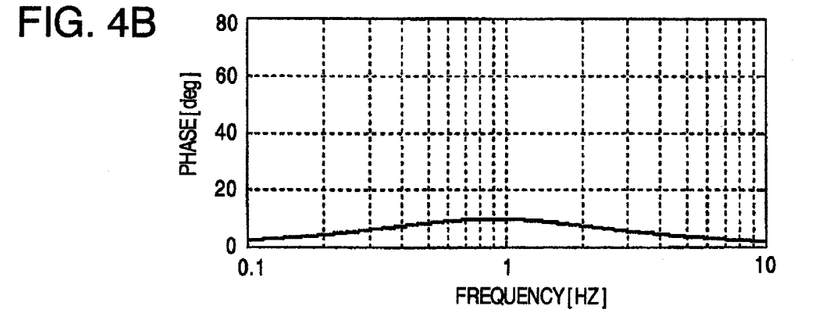

FIGS. 4A and 4B are graphs showing examples of frequency response characteristics of the transfer function A represented by the Expression 3. From FIGS. 4A and 4B, it is understood that the phase lead characteristics is nearly the same as that shown in FIGS. 3A and 3B, up to about 1 Hz.

Then, explanation will be given on effect of the present invention, provided by calculating lateral jerk Jy by using the transfer function A having the roll angular velocity p as input as explained above, in comparison with a conventional method, that is, the case where the lateral jerk was determined by differentiating (value of) the lateral acceleration measured by lateral acceleration sensor.

Figure 5A:
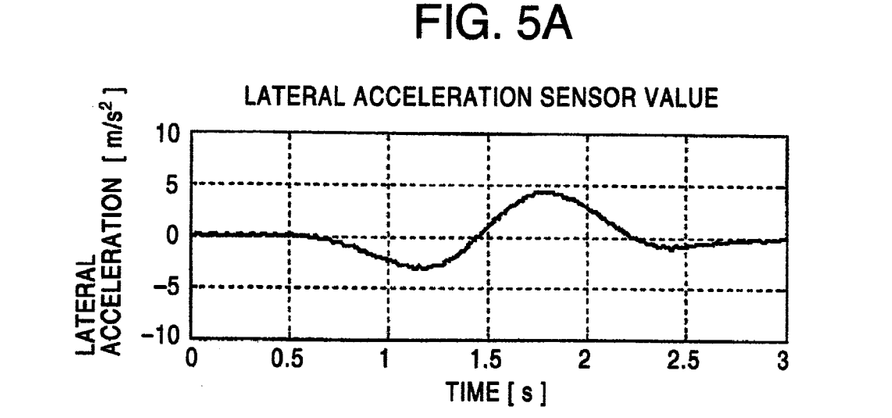
FIGS. 5A, 5B and 5C are graphs provided to explain the case where lateral jerk was calculated by a conventional method.
Figure 5B:
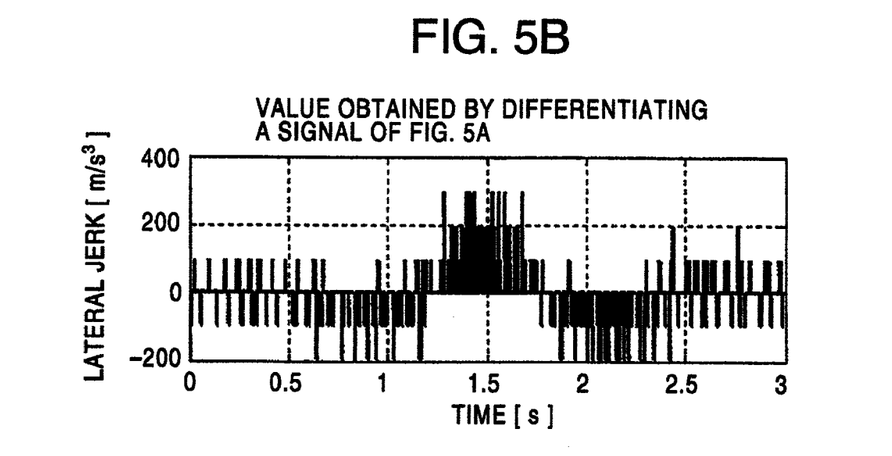
Figure 5C:
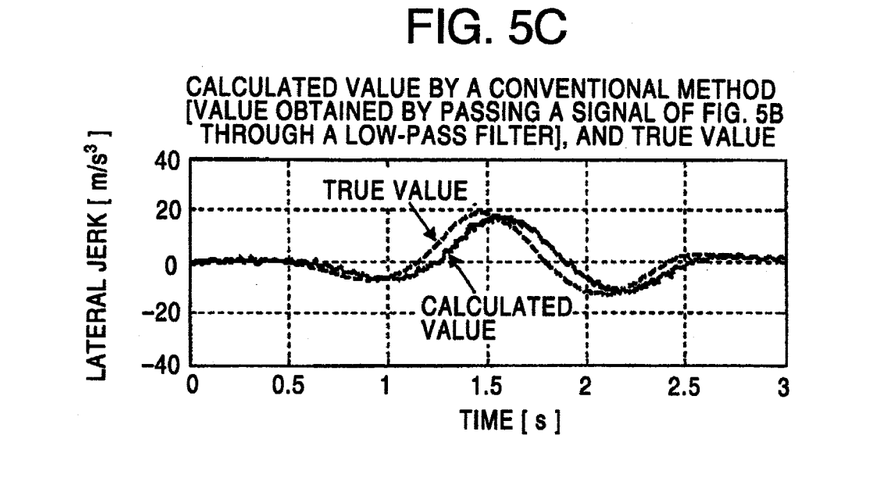

FIGS. 5A to 5C show the cases according to a conventional method: FIG. 5A shows lateral acceleration sensor value in carrying out the lane change by a passenger car, and FIG. 5B shows value differentiated a signal of FIG. 5A, which is understood to have very large noise. A solid line of FIG. 5C shows a value (calculated value) of lateral jerk determined by passing the differentiated value of FIG. 5B through a low-pass filter, and a broken line of FIG. 5C shows a true value of lateral jerk. The calculated value shown by the solid line in FIG. 5C has a far delayed phase as compared with true value shown by the broken line, and it is understood that accuracy of lateral jerk determined by a conventional method is inferior.

Figure 6A:
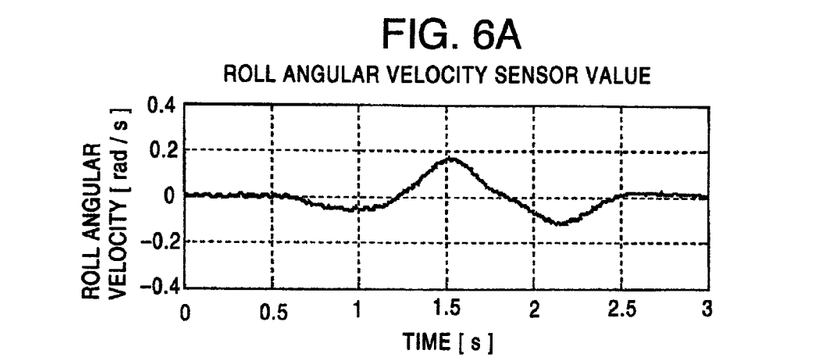
FIGS. 6A and 6B are graphs provided to explain the case where the lateral jerk was calculated by using the transfer function A.
Figure 6B:
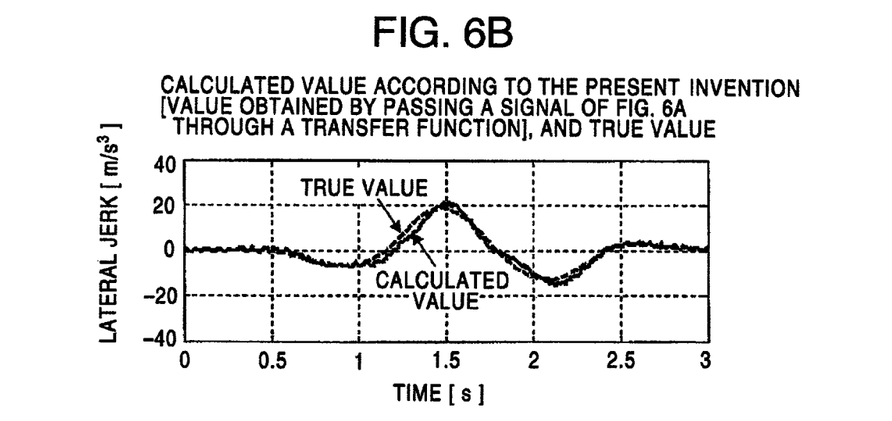

FIGS. 6A and 6B are graphs showing the case according to the present embodiment used a transfer function A: FIG. 6A shows, similarly to FIG. 5A, a roll angular velocity sensor value in carrying out the lane change by a passenger car. A solid line of FIG. 6B shows a value (calculated value) of lateral jerk determined by passing the roll angular velocity value of FIG. 6A through the transfer function A having frequency response characteristics shown in FIGS. 4A and 4B, and a broken line of FIG. 6B shows true value of lateral jerk. The calculated value shown by the solid line in FIG. 6B is nearly coincident with true value shown by the broken line, and it is understood that accuracy of lateral jerk is good.

As described above, in the present embodiment, the lateral jerk Jy is designed to be calculated by using the transfer function A having roll angular velocity p as input, therefore the lateral jerk having the good accuracy can be obtained.

Figure 7:
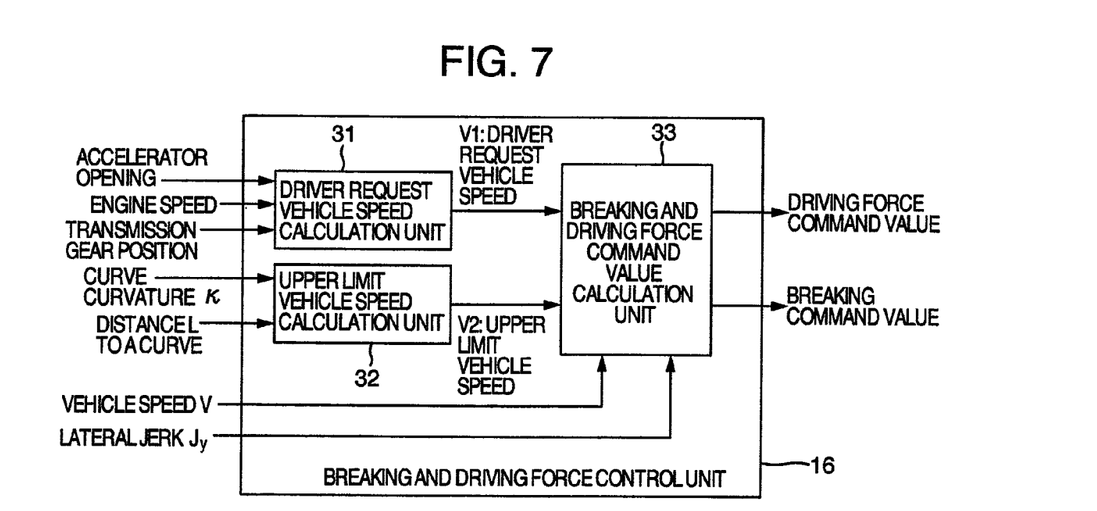
FIG. 7 is a functional block diagram showing a configuration example of a breaking and driving force control unit in the vehicle control apparatus shown in FIG. 1.

FIG. 7 is a functional block diagram showing a detailed configuration example of a breaking and driving force control unit 16 for carrying out breaking and driving force control by using the lateral jerk Jy calculated as explained above. The breaking and driving force control unit 16 is equipped with a driver request vehicle speed calculation unit 31, an upper limit vehicle speed calculation unit 32, and a breaking and driving force command value calculation unit 33.

The driver request vehicle speed calculation unit 31 calculates the vehicle speed V1, which is expected in the case where the present breaking and driving force control is not carried out, from the present acceleration opening degree detected by an acceleration pedal sensor (not shown), and engine speed and transmission gear position in a driving force generation apparatus 17, by using a map set in advance based on experimental results.

The upper limit vehicle speed calculation unit 32 calculates the upper limit value V2 of the present vehicle speed, which is necessary for stably travelling a curve, by detecting the curvature κ of the curve in a travelling direction (in the case or an arc, the curvature κ becomes an inverse number of radius) and distance L up to the curve, from a car navigation or a camera or the like (not shown).

In order to calculate the present upper limit vehicle speed V2, first, an upper limit vehicle speed V3 in a curve is calculated. The upper limit vehicle speed V3 in a curve brings the vehicle to upper limit vehicle speed, which is capable of travelling stably in the curve. For example, the target lateral acceleration Ay3 is set in advance, to calculate V3 from the Expression of V3=sqrt (Ay3/κ) (sqrt represents square root).

Then, the present upper limit vehicle speed V2 is calculated from upper limit vehicle speed V3 in a curve and distance L up to the curve, and it is output from an upper limit vehicle speed calculator 32. The present upper limit vehicle speed V2 brings the vehicle speed so as to decelerate smoothly before the curve. For example, by setting, in advance, the target deceleration degree Ax3, V2 is calculated from an Expression of V2=sqrt (2×Ax3×L+V3×V3). In addition, the present upper limit vehicle speed V2 may be calculated so as to decelerate while changing deceleration degree so as to make the absolute value of forward and afterward jerk small.

In addition, in the case where curvatures in a plurality of positions in a curve can be detected, V2 is each calculated based on curvature κ at each position, and the smallest value among them is output from an upper limit vehicle speed calculation unit 32.

The breaking and driving force command value calculation unit 33 outputs driving force command value for controlling the driving force generation apparatus 17, and braking command value for controlling the break 18.

Figure 8:
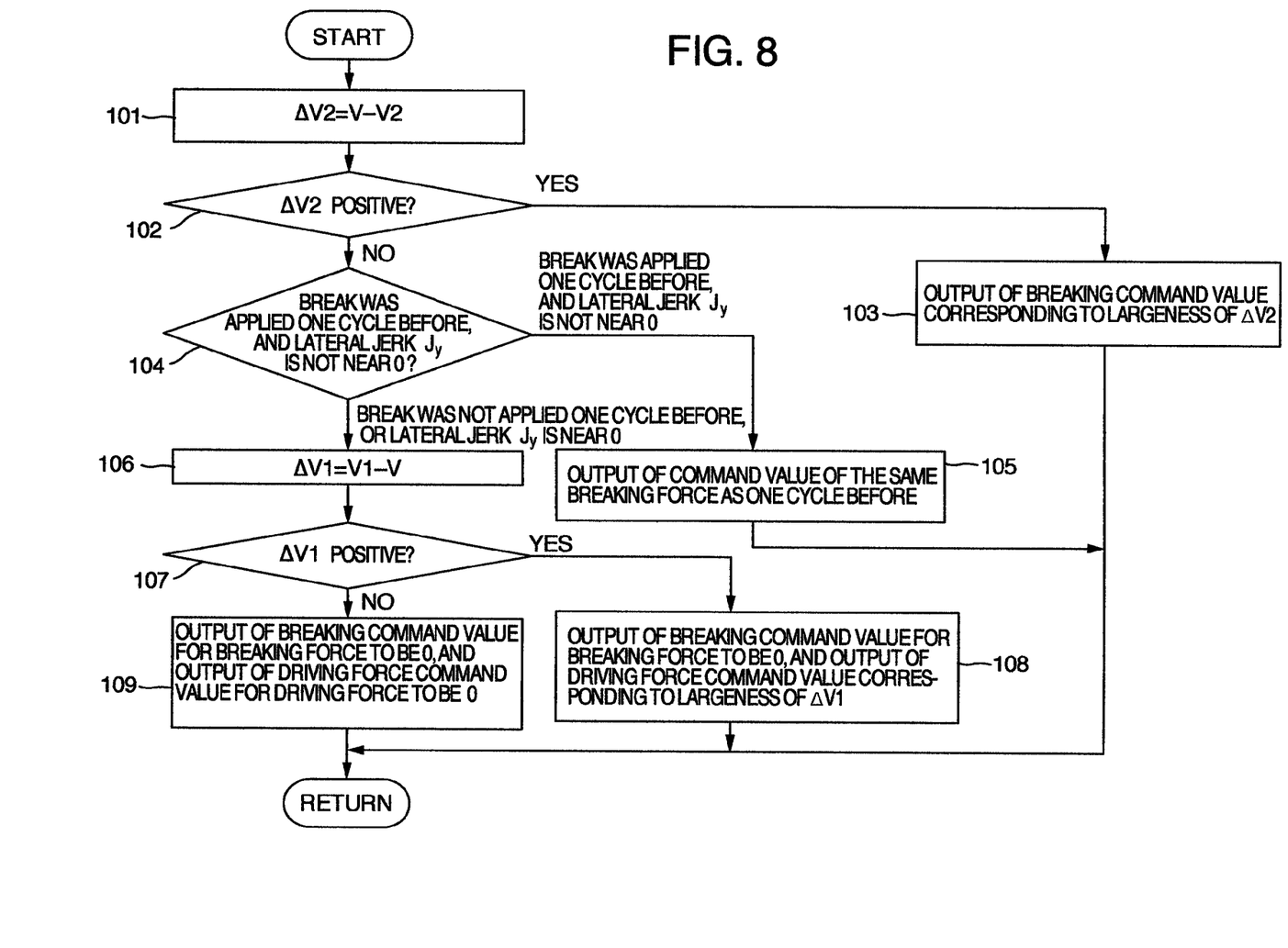
FIG. 8 is a flow chart showing a control calculation example to be carried out by a breaking and driving force control unit in the vehicle control apparatus shown in FIG. 1.

FIG. 8 is a flow chart showing a control calculation example carried out by the breaking and driving force command value calculation unit 33 in the breaking and driving force control unit 16.

In the flow chart shown in FIG. 8, a difference amount ΔV2 is obtained by subtracting the present upper limit vehicle speed V2 from the present vehicle speed V in the step 101, and in the next step 102, it is judged whether the difference amount ΔV2 is positive or not, and in the case of positive, it is forwarded to the step 103, and in the case of not positive, it is forwarded to the step 104.

The step 103 outputs the breaking command value in response to the largeness of the difference amount ΔV2. The breaking command value is set to such value, for example, that provides the stronger breaking with the larger difference amount ΔV2.

In step 104, it is determined whether the break was applied before one cycle, and whether the lateral jerk Jy is near 0 or not. If the brake was applied before one cycle and the lateral jerk Jy is not near 0, it is forwarded to the step 105. If the brake was not applied before one cycle, or the lateral jerk Jy is near 0, it is forwarded to the step 106.

It should be noted that because a period while the lateral jerk Jy is near 0, is nearly the same as a period while the roll angular velocity p is near 0, in the step 104, the value of roll angular velocity p may be used instead of the lateral jerk Jy.

The step 105 outputs the breaking command value having the same largeness of breaking force as in one cycle before. It should be noted that in this step 105, such command value may be output that the breaking force is gradually decreased from one cycle before.

In the step 106, difference amount ΔV1 is obtained by subtracting the present vehicle speed V from driver request vehicle speed V1, and in the subsequent step 107, it is judged whether the difference amount ΔV1 is positive or not, and in the case of positive, it is forwarded to the step 108, and in the case of not positive, it is forwarded to the step 109.

The step 108 outputs the breaking command value that the breaking force becomes 0, and the driving force command value in response to largeness of ΔV1. The driving force command value is set to such value, for example, that provides stronger driving force with the larger ΔV1.

The step 109 outputs the breaking command value that the breaking force becomes 0, and the driving force command value that driving force becomes 0. It should be noted that, in this step 109, such command value may be output that the driving force is gradually decreased from one cycle before.

By carrying out the above breaking and driving force control, safety travelling can be attained without speed over at a curve. In addition, it is designed so that deceleration is ended or acceleration is started in a period while lateral jerk value is nearly 0, and this acceleration or deceleration timing becomes the same as timing of driving operation of a driver, therefore, it can be said that travelling according to intention of a driver is realized.

It should be noted that in the case where the lateral jerk was calculated by a conventional method, as described before with reference to FIG. 5, because the calculated value has delayed phase as compared with true value, the timing that deceleration is ended or acceleration is started, is delayed, and there may be the case giving uncomfortable feeling to a driver.

Figure 9:
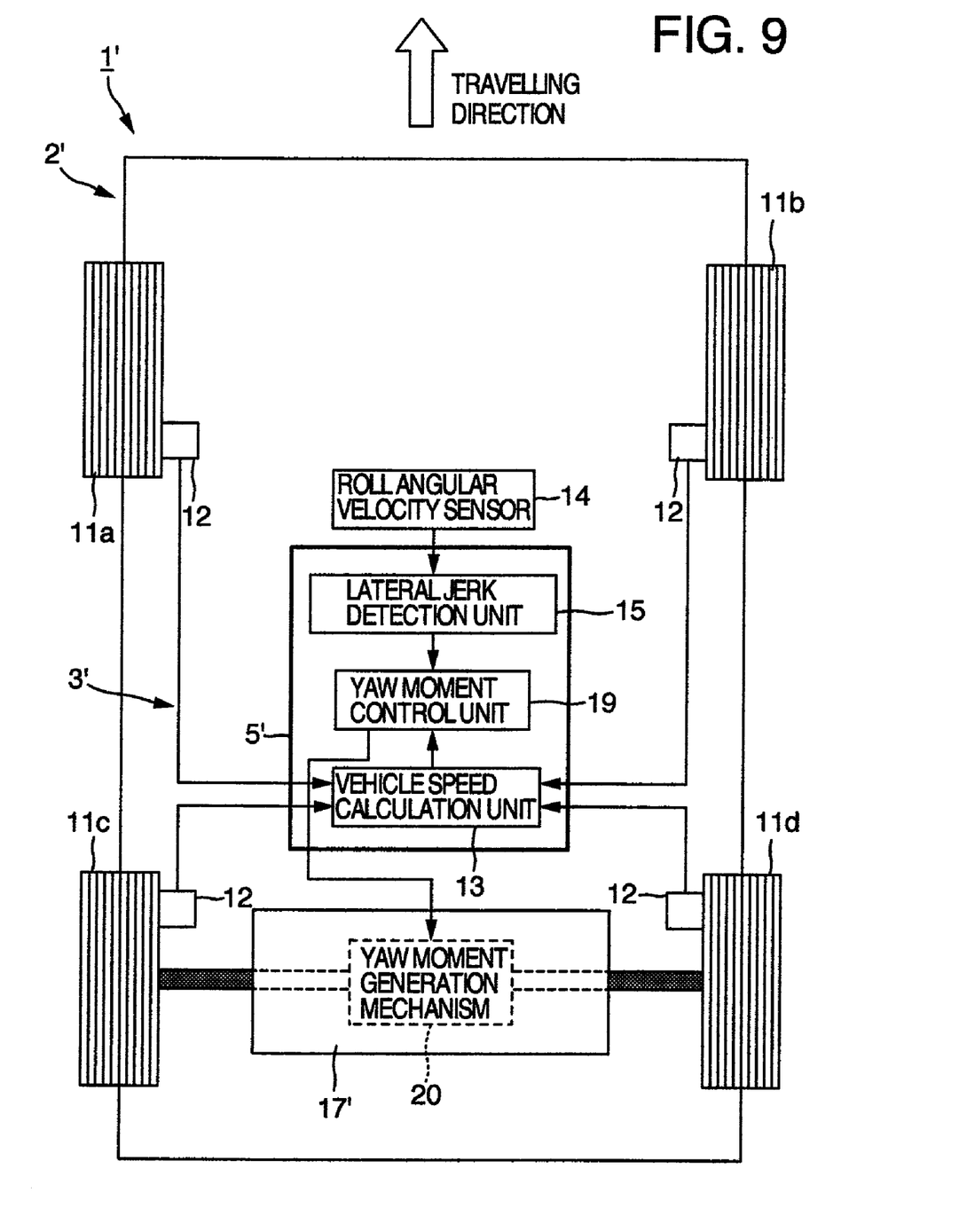
FIG. 9 is a schematic block diagram showing a vehicle where other embodiment of a vehicle control apparatus is applied.

FIG. 9 is a schematic block diagram showing a vehicle 1' where other embodiments of the vehicle control apparatus were applied. As for a vehicle 1' shown in FIG. 9, the same reference numbers are given to parts corresponding to each of parts of the vehicle 1 shown in FIG. 1, to omit the duplicated explanation, and in the explanation below, different points will be provided mainly between the vehicle control apparatus 3' of the present embodiment and the vehicle control apparatus 3 of the above embodiment.

In the above embodiment, it is designed so as to carry out the breaking and driving force control of a vehicle by using the lateral jerk Jy, however, in the present embodiment, it is designed to carry out yaw moment control of a vehicle by using the lateral jerk Jy, and it is designed that the rotation driving force from driving force generation apparatus 17', which is configured by, for example, a gasoline engine (or may be electrically-driven motor or the like) or transmission or the like, is transmitted to rear wheels 11c and 11d of the vehicle 1'.

In addition, at predetermined positions of a vehicle 2', a control unit 5' having a built-in microcomputer and electronic circuit parts for carrying out vehicle control is equipped as a main configuration element of a vehicle control apparatus 3' of the present embodiment, as well as the roll angular velocity sensor 14 is allocated.

The control unit 5' is equipped with, as shown by a functional block diagram in FIG. 9, a vehicle speed calculation unit 13, where a wheal speed signal from a wheel speed sensor 12 attached at each of the wheels 11a, 11b, 11c and 11d is input, and a lateral jerk calculation unit 15, where a roll angular velocity signal from the roll angular velocity sensor 14 is input, and a yaw moment control unit 19 for carrying out the vehicle control (here, yaw moment control) based on vehicle speed V and lateral jerk Jy or the like calculated by the vehicle speed calculation unit 13 and the lateral jerk calculation unit 15.

The yaw moment control unit 19 calculates the control command value for controlling a yaw moment generation mechanism 20, which is built in the driving force generation apparatus 17', based on vehicle speed V or lateral jerk Jy or the like. The yaw moment generation mechanism 20 is a mechanism to generate yaw moment of the vehicle 1', by generating torque difference between a left rear wheel 1c and a right rear wheel 1d. As for detail of the yaw moment generation mechanism, refer to, for example, JP-A-2007-139011, if necessary.

Figure 10:
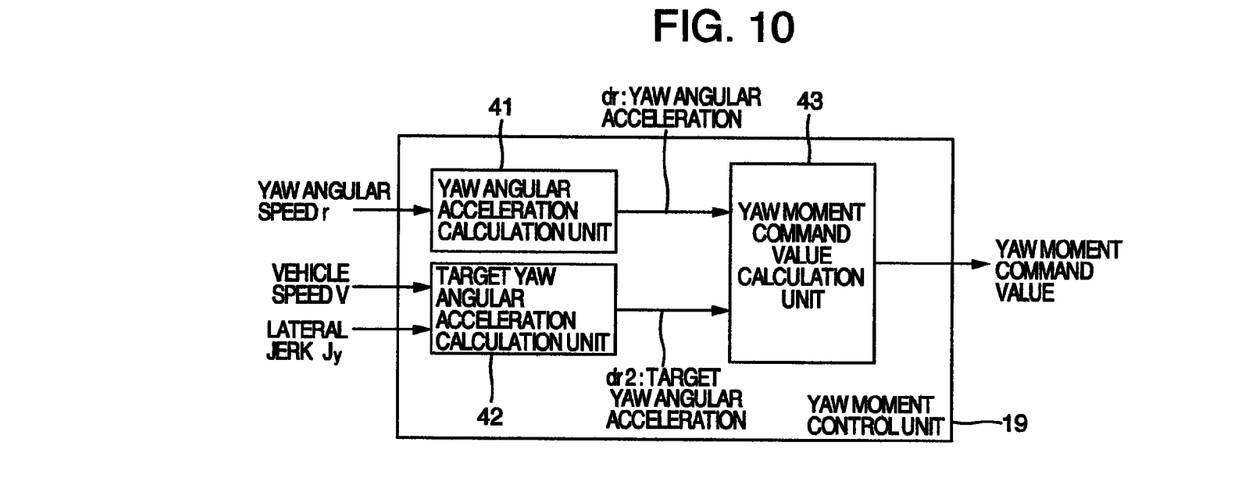
FIG. 10 is a functional block diagram showing a configuration example of a yaw moment control unit in the vehicle control apparatus shown in FIG. 8.

A detailed configuration example of the yaw moment control unit 19 is shown in the functional block diagram in FIG. 10. The yaw moment control unit 19 is equipped with a yaw angular acceleration calculation unit 41, which calculates a yaw angular acceleration dr by differentiating a value of yaw angular speed r detected by the yaw angular sensor (not shown), a target yaw angular acceleration calculation unit 42 and a yaw moment command value calculation unit 43.

The target yaw angular acceleration calculation unit 42 calculates the value of target yaw angular acceleration dr2 from Expression of dr2=Jy/V, by using lateral jerk Jy calculated by the lateral jerk calculation unit 15, and vehicle speed V calculated by the vehicle speed calculation unit 13.

The yaw moment command value calculation unit 43 outputs the yaw moment command value for generating the yaw moment in a direction to make close value of yaw angular acceleration dr and the target yaw angular acceleration dr2. That is, the yaw moment control unit 19 carries out the control to make close the value obtained by dividing the lateral jerk Jy with vehicle speed V, and the value of yaw angular acceleration.

By carrying out the control to output yaw moment command value in this way, the yaw moment is generated in a direction for promoting turning round in starting turning round, and yaw moment is generated in a direction for suppressing turning round in ending turning round, therefore, it is capable of significantly enhancing response property and convergence of vehicle movement, in other words, the quick and correct reaction can be obtained without generation of large blurring of a vehicle to steering of a driver.

It should be noted that in the case where the lateral jerk was calculated by a conventional method, as shown in FIG. 5, calculated value thereof has a delayed phase as compared with true value, resulting in delay in generation timing of yaw moment, therefore, not only the response property and convergence of vehicle movement cannot be enhanced but also the reversed effect may arise in some cases.

Figure 11:
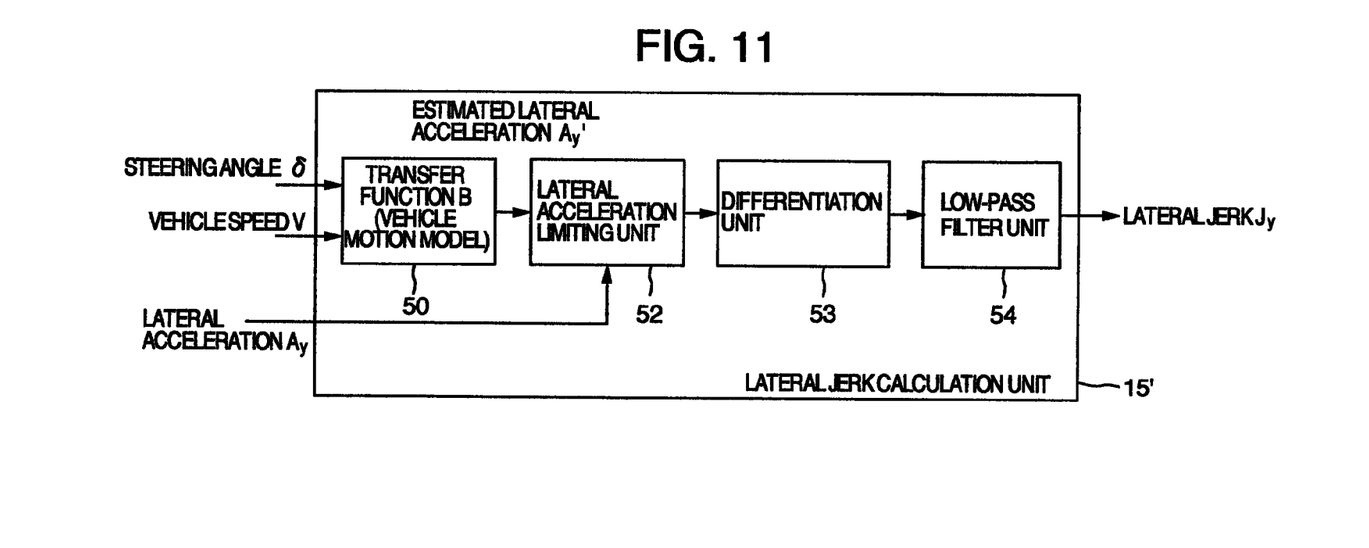
FIG. 11 is a block diagram showing other configuration example of a lateral jerk calculation unit.

Then, explanation will be given on other example of lateral jerk calculation unit. FIG. 11 shows the lateral jerk calculation unit 15' with different configuration from a lateral jerk calculation unit 15 of the above embodiment.

This lateral jerk calculation unit 15' calculates the lateral jerk Jy by using (a vehicle motion model 50 expressed by) the transfer function B having steering angle δ detected by a steering angle sensor (not shown) as input and the lateral acceleration as output.

In detail, by expressing those obtained by Laplace transformation of the steering angle δ and the lateral acceleration Ay' as δ(s) and Ay'(s), respectively, there is given the transfer function B=Ay'(s)/δ(s), and the lateral acceleration Ay' is calculated from the following Expression 4 (Reference Literature: "Motion and control of an automobile" by Abe Masato, second edition, pages 93 and 52, published from Sankaido). Here, in the following Expression 4, V represents vehicle speed, s represents Laplace operator, and further, m: vehicle weight Iz: vehicle yaw inertia moment lf: distance between centers of gravity of front axes lr: distance between centers of gravity of rear axes Kf: cornering power of front wheels Kr: cornering power of rear wheels n: steering gear ratio $$\frac{A'_y(s)}{\delta(s)} = \frac{'2I_z K_f V s^2 + 4ll_r K_f K_r s + 4lK_f K_r V}{mV I_z s^2 + \{2m(l_f^2 K_f + l_r^2 K_r) + 2I_z(K_f + K_r)\}s + \left\{\frac{4l^2 K_f K_r}{V} - 2mV(l_f K_f - l_r K_r)\right\}} \cdot \frac{1}{n} \quad (4)$$

Figure 12A:
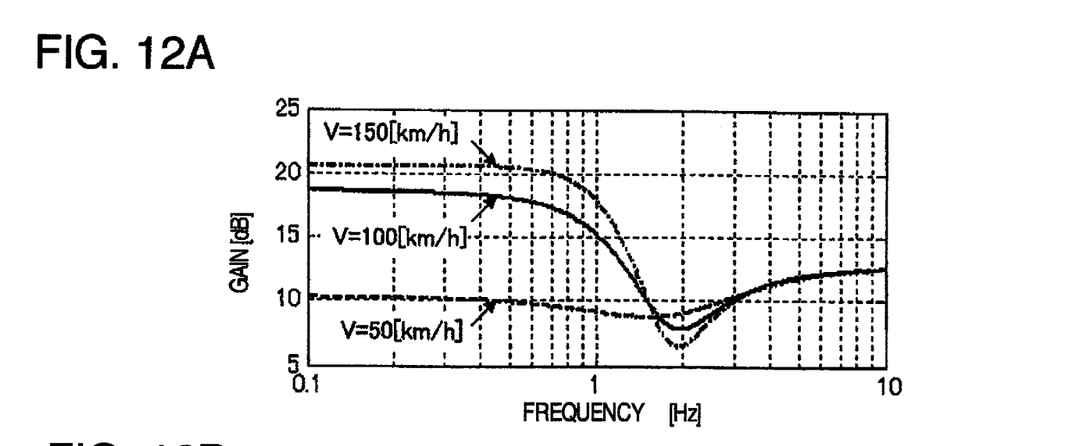
FIGS. 12A and 12B are graphs provided to explain frequency response characteristics of the transfer function B [Expression 4] shown in FIG. 11.
Figure 12B:
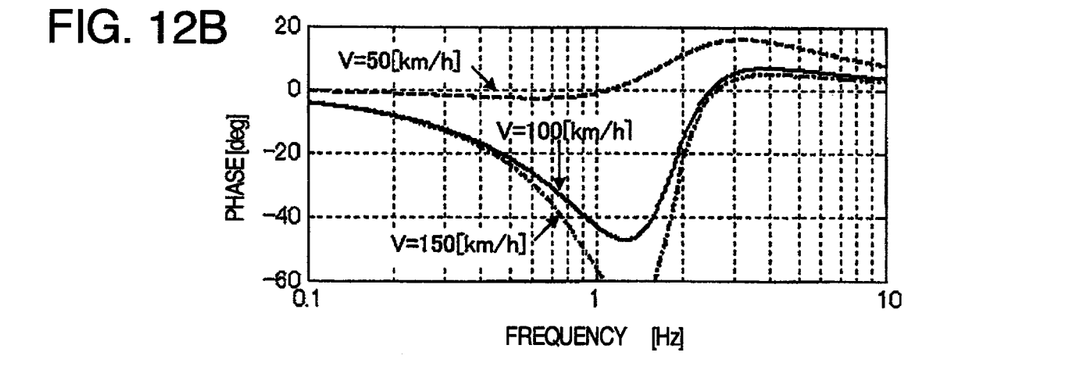

FIGS. 12A and 12B show examples of frequency response characteristics of the transfer function B represented by the Expression 4. As shown in Figures, the transfer function B is characterized in that characteristics thereof changes with vehicle speed V, and also has low-pass characteristics up to about 1 Hz.

In addition, the transfer function B may be calculated by the following Expression 5 may be used, which is a simplified form of the Expression 4.

$$\frac{A'_y(s)}{\delta(s)} = \frac{1}{T_0 s + 1} \cdot \frac{4lK_f K_r V}{\frac{4l^2 K_f K_r}{V} - 2mV(l_f K_f - l_r K_r)} \cdot \frac{1}{n} \quad (5)$$

T0 of the above Expression 5 is designed to be changed in response to vehicle speed V by using a map. The map is set in advance so that the frequency response characteristics up to about 1 Hz becomes close to characteristics shown in FIGS. 12A and 12B.

Figure 13A:
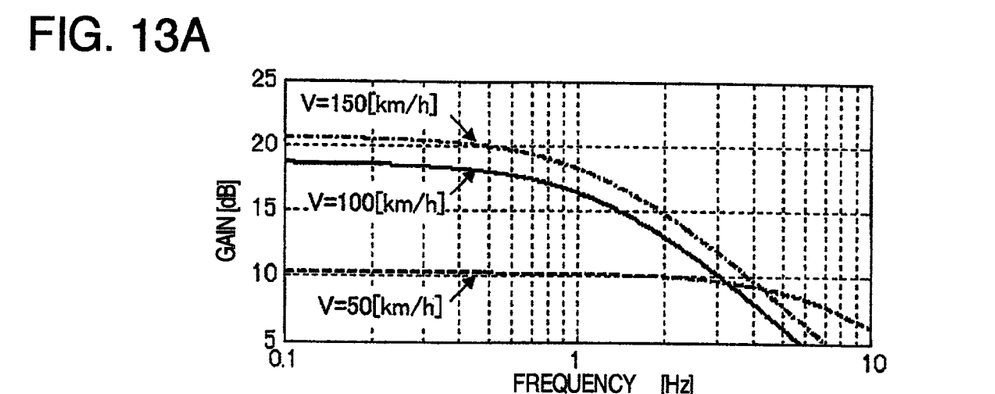
FIGS. 13A and 13B are graphs provided to explain frequency response characteristics of the transfer function B [Expression 5] shown in FIG. 11.
Figure 13B:
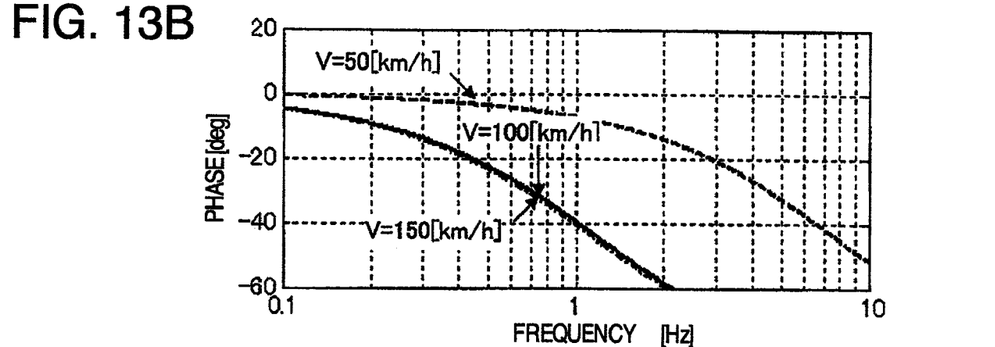

FIGS. 13A and 13B show examples of frequency response characteristics of the transfer function B represented by the Expression 5. As shown in FIGS. 13A and 13B, it is understood that it has low-pass characteristics up to about 1 Hz, nearly the same as in FIGS. 12A and 12B.

An estimated lateral acceleration Ay' calculated by the transfer function B is processed by sequentially sending to a lateral acceleration limiting unit 52, a differentiation unit 53 and a low-pass filtering unit 54, which are equipped in a lateral jerk calculation unit 15', and is taken out as the lateral jerk Jy, as shown in FIG. 11. That is, in the lateral acceleration limiting unit 52, it is limited to ±ΔAy of lateral acceleration Ay detected by a lateral acceleration sensor (not shown) (ΔAy is, for example, 1 m/sec²). That is, the lateral acceleration limiting unit 52 outputs (Ay+ΔAy), when Ay' is larger than (Ay+ΔAy); outputs (Ay−ΔAy), when Ay' is smaller than (Ay−ΔAy); and outputs Ay' when Ay' is none of these.

Output of this lateral acceleration limiting unit 52 is differentiated in the differentiation unit 53, and the high frequency components of the value output from the differentiation unit 53 are removed in the subsequent low-pass filtering unit 54. The cut-off frequency of the low-pass filtering unit 54 is set so that noise is removed as much as possible, and set to frequency (for example, 3 Hz) not to give influence on control. It should be noted that the lateral acceleration limiting processing, differentiating processing and filtering processing are designed here to be carried out by a built-in microprocessor in the control unit 5, however, it may be designed to be carried out by other electronic circuit as its substitution.

Then, explanation will be given on effect by calculating the lateral jerk Jy by using the transfer function B having the steering angle δ as input and lateral acceleration Ay' as output, with reference to FIG. 14A and FIG. 15.

Figure 14A:
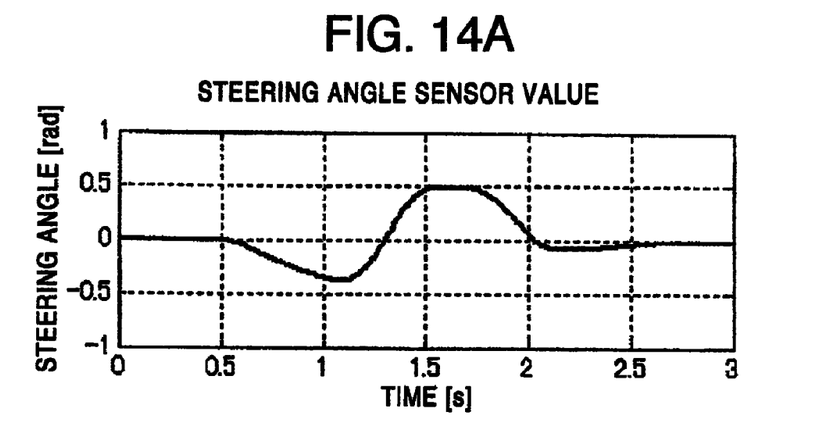
FIGS. 14A, 14B and 14C are graphs provided to explain the case where the lateral jerk was calculated by using the transfer function B.
Figure 14B:
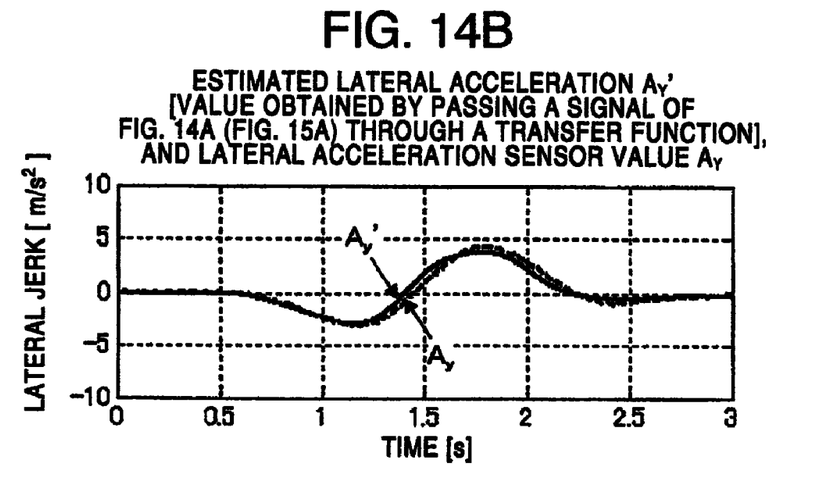
Figure 14C:
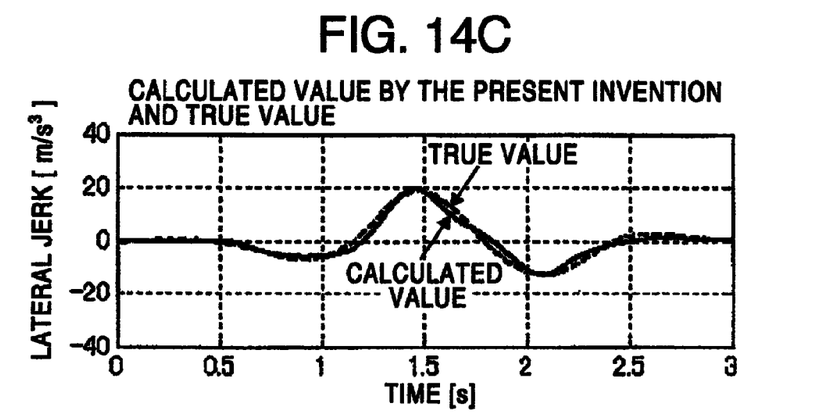

FIG. 14A shows steering angle sensor value in travelling similarly to in the case shown in FIG. 5 and FIG. 6. The estimated lateral acceleration Ay' calculated by inputting this steering angle sensor value to the transfer function B, is shown by a solid line in FIG. 14B, and the lateral acceleration sensor value Ay is shown by a broken line in FIG. 14B. The estimated lateral acceleration Ay' shown by the solid line in FIG. 14B and the lateral acceleration sensor value Ay shown by the broken line Ay are nearly the same, and absolute value of difference between them is always within ΔAy (1 m/s²), therefore the output of the lateral acceleration limiting unit 52 is always the same as Ay'. The solid line of FIG. 14C shows a signal obtained by differentiating the output of the lateral acceleration limiting unit 52 by the differentiation unit 53 and after passing it through the low-pass filtering unit 54, that is, shows a value (calculated value) of lateral jerk calculated by the lateral jerk calculation unit 15' of the present embodiment, and the broken line of FIG. 14C is true value of lateral jerk. The calculated value shown by the solid line in FIG. 14C is nearly coincident with true value shown by the broken line, and thus it is understood that the lateral jerk determined by the lateral jerk calculation unit 15' of the present embodiment has a good accuracy.

Figure 15A:
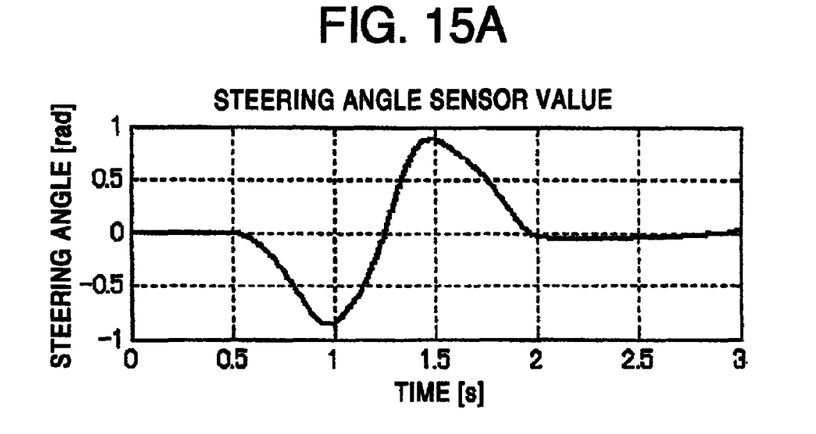
FIGS. 15A, 15B and 15C are graphs provided to explain the case where the lane change was carried out so rapidly as a vehicle skids, in the case where the lateral jerk is calculated by using the transfer function B.
Figure 15B:
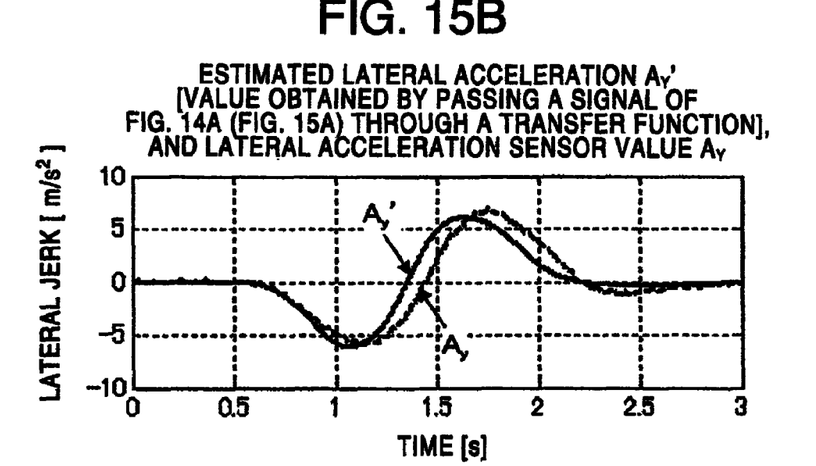

FIG. 15A shows a steering angle sensor value in the case where the lane change was carried out so rapidly as a vehicle skids; a solid line of FIG. 15B shows the estimated lateral acceleration Ay' calculated by inputting a signal (steering angle sensor value) of FIG. 15A to the transfer function B; and a broken line of FIG. 15B is the lateral acceleration sensor value Ay. There is a period when the estimated acceleration Ay' shown by the solid line of FIG. 15B and the lateral acceleration sensor value Ay shown by the broken line are far apart, and the output of lateral acceleration limiting unit 52 during that period becomes the lateral acceleration sensor value Ay, and the output of lateral acceleration limiting unit 52 during other than that period becomes the estimated lateral acceleration Ay'. The solid line of FIG. 15C shows a signal obtained by differentiating the output of lateral acceleration limiting unit 52 by the differentiation unit 53 and after passing it through the low-pass filtering unit 54, that is, shows the value (calculated value) of lateral jerk determined by the lateral jerk calculation unit 15' of the present embodiment, and the broken line of FIG. 15C is the true value of lateral jerk.

Figure 15C:
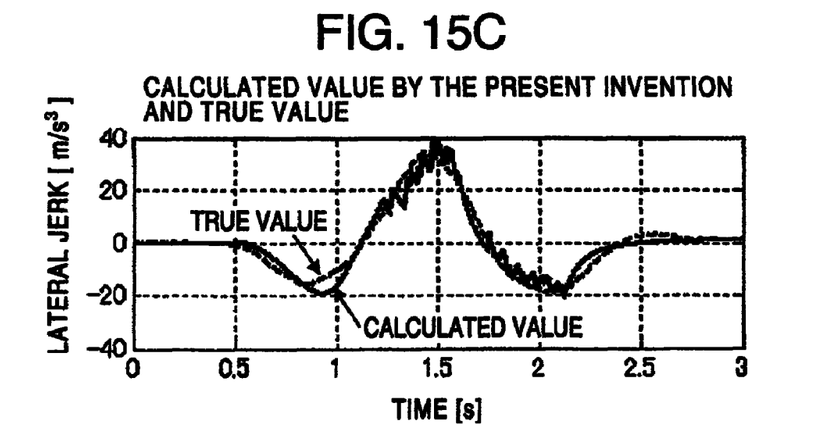

The calculated value shown by the solid line in FIG. 15C is nearly coincident with true value shown by the broken line, and thus it is understood that the lateral jerk determined by the lateral jerk calculation unit 15' of the present embodiment has a good accuracy.

As described above, even in the lateral jerk calculation unit 15' of the present embodiment, the lateral jerk can be calculated with high accuracy. By using the value of lateral jerk calculated with high accuracy in this way, the control to end deceleration or start acceleration can be carried out adequately during a period when value of lateral jerk is near zero, and the control of acceleration and deceleration can be carried out without generation of uncomfortable feeling to a driver. In addition, similarly to in the above embodiment, the yaw moment can be generated in a direction for promoting turning round (revolving) in starting turning round (revolving), and yaw moment can be generated in a direction for suppressing turning round (revolving) in ending turning round (revolving), therefore, it is capable of significantly enhancing response property and convergence of vehicle movement.

It should be noted that in the above embodiment, it is designed so as to end deceleration or start acceleration during a period when value of lateral jerk is near zero, however, in this case, because a period while the value of lateral jerk is near 0 and the period while value of roll angular velocity is near 0 are nearly coincident with each other, it may be designed that deceleration is ended or acceleration is started during a period when value of roll angular velocity is near 0. In addition, depending on a travelling state, such control may be adopted that acceleration or deceleration is started, acceleration or deceleration is ended, or acceleration is kept constant, instead of "ending deceleration or starting acceleration".

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A vehicle control apparatus comprising:
   a vehicle state quantity detection unit for detecting a vehicle state quantity;
   a lateral jerk calculation unit for calculating a lateral jerk of a vehicle in a lateral vehicle direction based on said vehicle state quantity, said lateral jerk calculation unit estimating said lateral jerk using a transfer function having, as input, a roll angular velocity of the vehicle and, as output, an estimated lateral jerk; and
   a control unit for carrying out vehicle control so as to start a vehicle acceleration or deceleration in an anterior-posterior longitudinal direction of the vehicle, end the vehicle acceleration or deceleration in said anterior-posterior longitudinal direction of the vehicle, or make the vehicle acceleration in said anterior-posterior longitudinal direction of the vehicle constant when a value of said estimated lateral jerk is near zero.

2. A vehicle comprising the vehicle control apparatus according to claim 1.

3. A vehicle control apparatus comprising:
   a vehicle state quantity detection unit for detecting a vehicle state quantity, including a steering angle of a vehicle;
   a lateral jerk calculation unit for calculating a lateral jerk of the vehicle in a lateral vehicle direction based on said vehicle state quantity, said lateral jerk calculation unit estimating said lateral jerk based on said steering angle; and
   a control unit for carrying out vehicle control so as to start a vehicle acceleration or deceleration in an anterior-posterior longitudinal direction of the vehicle, end the vehicle acceleration or deceleration in said anterior-posterior longitudinal direction of the vehicle, or make the vehicle acceleration in said anterior-posterior longitudinal direction of the vehicle constant when a value of said lateral jerk is near zero.

4. A vehicle comprising the vehicle control apparatus according to claim 3.

* * * * *